UNITED STATES PATENT OFFICE.

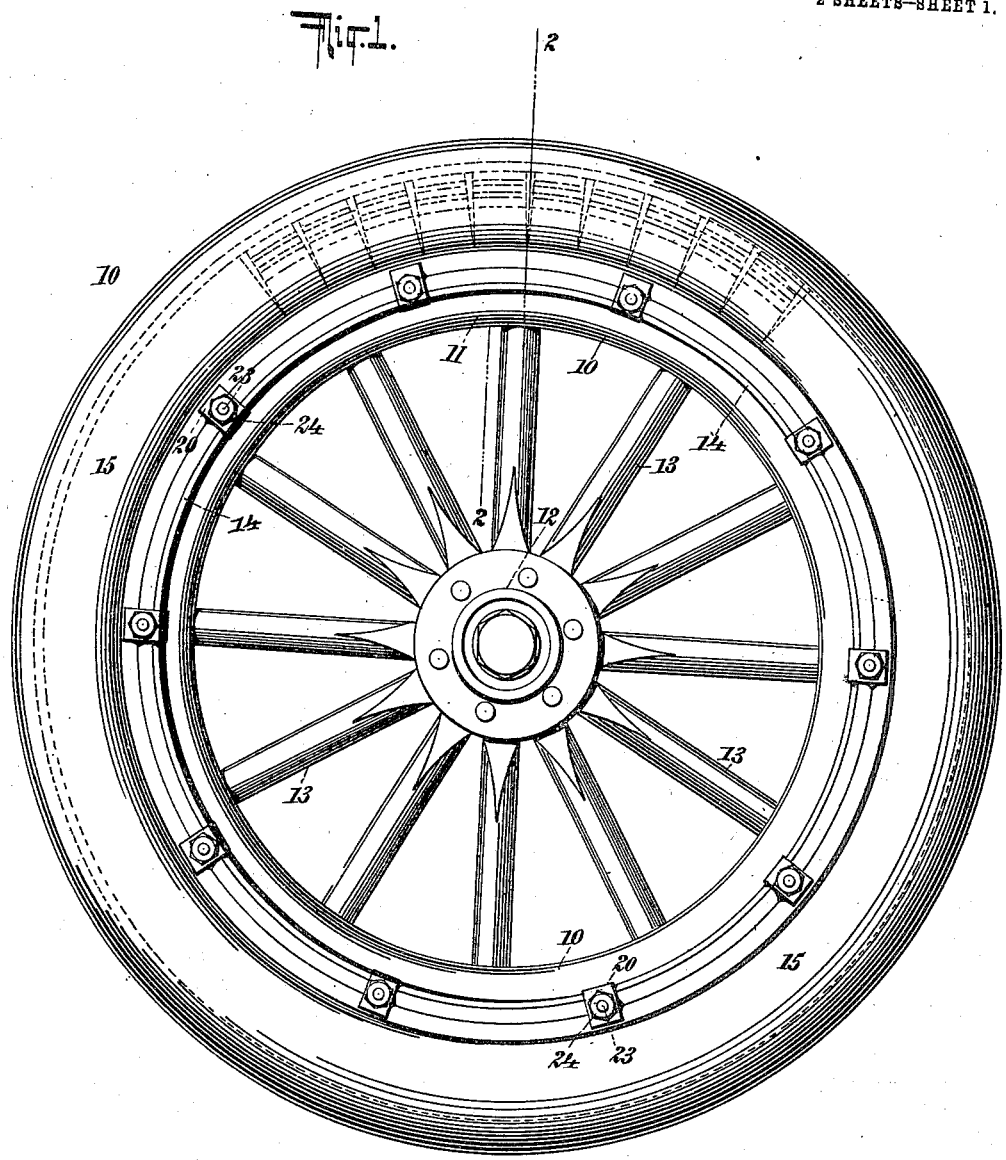

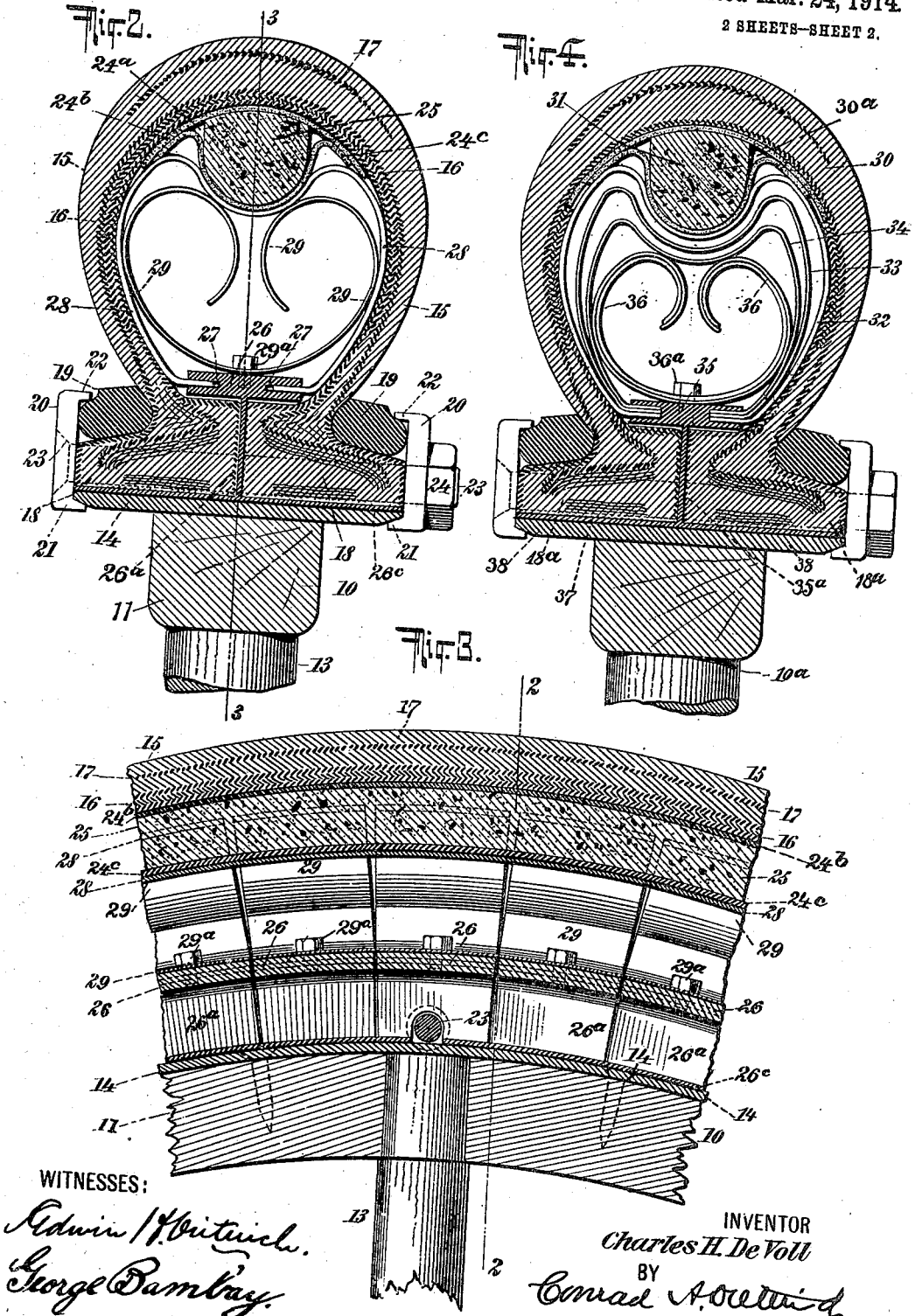

CHARLES H. DE VOLL, OF NEW YORK, N. Y.

VEHICLE-TIRE.

1,090,838.

Specification of Letters Patent. Patented Mar. 24, 1914.

Application filed March 30, 1909. Serial No. 486,770.

*To all whom it may concern:*

Be it known that I, CHARLES H. DE VOLL, a citizen of the United States, residing at the city of New York, borough of Manhattan, county and State of New York, have invented certain new and useful Improvements in Vehicle-Tires, of which the following is a full, clear, and exact specification.

My invention relates to improvements in vehicle wheels, and the same has for its object more particularly to provide a resilient tire for wheels designed for use in connection with motor vehicles.

Further, said invention has for its object to provide a tire comprising an outer shoe or casing, and means for maintaining the casing normally distended by means of a series of resilient reinforcing members arranged therein.

Further, said invention has for its object to provide a tire in which the reinforcing means is composed of a series or plurality of separated members which may be slipped into place and arranged side by side to completely fill the interior of the tire.

Further, this invention has for its object to provide a resilient tire wherein each resilient reinforcing member is composed of a plurality of springs arranged one within the other, which jointly serve to absorb the impact imparted to the wheel by the inequalities in the road.

Further, said invention has for its object to provide a tire in which the resilient reinforcing means is composed of a plurality of sections, each having a series of separated resilient members therein consisting of a set of nested springs.

To the attainment of the aforesaid objects and ends my invention consists in the novel details of construction, and in the combination, connection and arrangement of parts hereinafter more fully described, and then pointed out in the claims.

In the accompanying drawings forming part of this specification, wherein like numerals of reference indicate like parts, Figure 1 is a side view showing a wheel with one form of tire constructed according to and embodying my said invention; a part of the resilient reinforcing means being shown in dotted lines at the upper edge of the wheel; Fig. 2 is an enlarged transverse section taken on the line 2—2 of Fig. 1; Fig. 3 is a section taken on the line 3—3 of Fig. 2; and Fig. 4 is a transverse section showing a modified construction.

In said drawings 10 designates the wheel as a whole comprising a rim 11, hub 12 and spokes 13 13 uniting said hub with said rim in the ordinary manner. Upon the outer circumference of the rim 11 is arranged an annular plate or rim 14 which is secured by screws or other suitable means to the surface of said rim 11.

15 denotes a casing preferably made of rubber or other flexible material and provided adjacent to and upon its inner surface with a series of canvas strips or layers 16, 16 vulcanized together and to the inner surface of the shoe 15, and within the tread portion of said shoe is embedded a breaker strip 17 of canvas or analogous material. Along the edges of said casing 15 are provided beads or flanges 18 18 having vertical opposing edges and inner horizontal edges. 19 19 denote rings or annular members disposed upon the outer surface of the beads or flanges 18 18 at the junction of said beads or flanges with the body portion of said casing, and 20 20 clips having projections 21 21 at their lower edges adapted to engage the underside of the annular plate 14, and similar projections 22 22 at their upper edges adapted to engage the annular members 19 19. 23 23 denote bolts extending through said clips 20 20 and the transverse recesses provided in the under sides of the beads or flanges 18 18 supported above the annular plate 14. The numerals 24 24 denote nuts provided upon the threaded ends of said bolts, whereby said clips 20 20 may be firmly held in engagement with the edges of the annular plate 14 and the outer edges of the annular members 19 19 whereby to hold said annular members 19 19 in firm engagement with the beads or flanges 18 18 of the casing, and the edges of said beads in engagement with each other and in position upon the annular plate 14. Upon the inner side of said shoe 15 is provided a circular casing 24ª made of leather, canvas or other suitable material, and comprising an outer section 24ᵇ adapted to lie against the inner surface of the casing 15, and an inner section 24ᶜ which is made narrower than said outer section and secured to said outer section by parallel rows of stitching, to form a casing adapted to receive an annular or circular rib 25, of rubber or other suitable material and preferably made substantially semi-circular in cross section.

26 26 denote sectional plates arranged upon the inner surface of the opposing edges of the blades or flanges 18 18. Each of said sections is mounted upon a flat vertical support 26ª arranged intermediate the opposing edges of the beads 18 18, and secured at its lower edge to a segmental plate 26ᶜ. The opposite edges of each sectional plate 26 are provided with recesses or grooves 27 27 which are adapted to receive the ends of a resilient reinforcing member 28 which has its upper portion conformed to the inner edge of the rib 25 arranged within the casing 24ª, and its sides conformed substantially to the inner surfaces of the shoe 15. The extremities of each reinforcing member 28 are bent at an angle to the main portion thereof, and are secured within the recesses 27 27 of said segmental plate 26.

Within the outer resilient reinforcing member 28 is disposed a second or supplemental member 29 which is substantially semi-circular in outline, and has its central or intermediate portion resting upon the inner surface of the annular plate 26 and secured in position thereon by a screw 29ª. The free ends of said supplemental member are bent outwardly, inwardly, downwardly and slightly outwardly again, and have portions thereof adjacent to their free ends in contact with, and bearing against the curved intermediate portion of the member 28 at a point adjacent to the inner edge of the annular rib 25 arranged upon the inner surface of said casing.

In the modification illustrated at Fig. 4 the tire is constructed essentially as hereinbefore described, except that within the outer casing 30, and below the casing 30ª containing the rib 31, are arranged series of resilient reinforcing members each comprising an outer member 32 which corresponds substantially in outline with the interior of the casing 30 and within said outer resilient member 32 are disposed a plurality of resilient members 33 and 34 each of which corresponds substantially in outline therewith but is somewhat smaller than the one next inclosing the same. The ends of said resilient members 32 33 34 are brought together and secured within the grooves provided in the opposite edges of the sectional plates 35 35. Within the resilient member 34 are disposed central or supplemental spring members 36 36 which are arranged one within the other and rest at a point intermediate of their ends upon said sectional plates 35, 35, and are secured in position thereon by a screw 36ª. The free ends of said supplemental spring members 36, 36 are bent outwardly and engage the inner surface of the innermost resilient member 34, at the sides thereof, and also engage the same below the casing 30ª directly below the inner edge of the annular rib. The sectional plates 35 35 are also mounted upon vertical supports 35ª 35ª which are arranged intermediate the opposing edges of the beads or flanges 18ª 18ª, and secured at their lower ends to segmental plates 37 which are disposed upon an annular plate 38 secured upon the wheel 10ª.

When it is desired to set up a tire it merely becomes necessary to insert the required number of segmental plates in position within the shoe 15, and the beads or flanges 18 18 of the shoe are then brought together upon the annular plate 14 of the rim 11, and the whole secured in position thereon by means of the annular members or rings 19 19, clips 20 20, bolts 23 23 and nuts 24 24.

Having thus described my invention, what I claim and desire to secure by Letters Patent is:

1. A vehicle tire comprising a flexible outer casing, an annular support therefor, an annular, elastic rib arranged upon the inner surface of said flexible outer casing, a casing inclosing said annular rib, a series of graduated resilient members secured upon said annular support, and within said flexible outer casing, said graduated, resilient members having inwardly projecting portions embracing said annular rib and its inclosing casing, and supplemental, resilient reinforcing members arranged within said graduated resilient members having their free ends extending inwardly and engaging, adjacent to said free ends, the projecting portions of said series of graduated resilient members whereby to resist the inward movement thereof, substantially as specified.

2. A vehicle tire comprising a casing, an annular support therefor, a series of segmental plates arranged thereon, supports on said segmental plates, a series of resilient reinforcing members having their ends disposed within said supports, and supplemental, resilient reinforcing members disposed within said first-named reinforcing members having their free ends extending inwardly and having portions adjacent to their free ends engaging said first-named reinforcing members intermediate the ends thereof, substantially as specified.

3. A vehicle tire comprising an outer casing, a casing therein, an annular rib arranged within said inner casing adjacent to the tread portion of said outer casing, an annular support arranged below said casing, a series of vertical supports thereon, sectional plates mounted upon said supports having recesses in their opposite edges, a plurality of curved, resilient reinforcing members secured to said sectional plates and engaging the inner surface of said outer casing and the annular rib inclosed within said inner casing, and supplemental, resilient reinforcing members supported intermediate their ends upon said sectional plates and having the free ends extending inwardly and having portions adjacent to their free ends in engagement with said reinforcing members first-mentioned, substantially as specified.

4. The combination with a vehicle wheel, of an annular plate secured thereon, a flexible casing having its edges in contact and supported upon said annular plate, sectional plates disposed within said flexible casing having recesses in their opposite edges, segmental plates disposed intermediate said annular plate and said casing, a series of vertical supports on said segmental plates for supporting said sectional plates, a series of resilient reinforcing members disposed in said casing having their ends secured within the recesses in said sectional plates, supplemental reinforcing members supported intermediate their ends upon said sectional plates and having their ends extending outwardly and inwardly and contacting adjacent to their ends with the inner surface of said resilient reinforcing members first-named, and means for securing the edges of said casing together and to said wheel, substantially as specified.

5. The combination with a vehicle wheel, of an annular plate secured thereon, a flexible casing having its edges disposed upon said annular plate, segmental plates disposed upon said annular plate, a series of vertical supports thereon extending upwardly between the edges of said flexible casing, sectional plates mounted upon said vertical supports having recesses in their opposite edges and arranged within said flexible casing, a series of curved, resilient reinforcing members disposed within said casing having their ends secured in the recesses in said sectional plates, supplemental, resilient reinforcing members supported intermediate their ends upon said sectional plates and having their ends bent outwardly and inwardly and contacting adjacent to their free ends with the inner surface of said resilient reinforcing members first-named, and means for securing the edges of said casing together and to said wheel, substantially as specified.

6. The combination with a vehicle wheel, of an annular plate secured thereon, a flexible casing, flanges thereon, segmental plates disposed upon said annular plate, vertical supports extending radially therefrom between the edges of said casing, sectional plates secured to said vertical supports having recesses in their opposite edges, a series of curved, reinforcing members disposed within said casing, each comprising a plurality of similarly-shaped resilient members having their ends located in the recesses in said sectional plates, supplemental resilient reinforcing members disposed within the innermost of said curved reinforcing members first-named and supported midway between their ends upon said sectional plates, and having their ends bent outwardly and inwardly and contacting adjacent to their free ends with the inner surface of the innermost member of said series of curved reinforcing members, and means for clamping the edges of said casing together and upon the annular plate on said wheel, substantially as specified.

7. The combination with a vehicle wheel, of an annular plate secured thereon, a flexible outer casing disposed upon said plate, beads arranged upon the edges of said casing having transverse registering recesses therein, a circular casing having laterally projecting members arranged upon the inner side of the tread portion of said outer casing, a flexible rib disposed within said circular casing, a series of segmental plates disposed upon said annular plate, flat vertical supports extending upwardly from said segmental plate between the edges of said casing, and having recesses in their opposite edges, a series of graduated resilient reinforcing members disposed within said casing and embracing the annular rib therein, each of said reinforcing members comprising a plurality of similarly-shaped resilient members having their ends brought together and secured within the recesses in said sectional plates, a plurality of supplemental resilient reinforcing members disposed within the innermost of said series of graduated reinforcing members and secured midway between their ends upon said segmental plates and having their ends bent outwardly and inwardly and contacting adjacent to their ends with the inner surface of the innermost member of said series of reinforcing members, flanges disposed upon the opposite sides of said casing adjacent to the edges thereof, clamping members engaging said flanges and annular plates, and bolts extending through said clamping members and the recesses in the flanges of said casing for securing said flanges and the edges of said casing together and to said annular plate, substantially as specified.

Signed at the city of New York, in the county and State of New York, this 23d day of March, nineteen hundred and nine.

CHARLES H. DE VOLL.

Witnesses:
CONRAD A. DIETERICH,
MAY R. BURKE.